Oct. 10, 1933.  P. J. M. ESCOLE  1,930,424

GLASS SHEET FORMING APPARATUS

Filed Aug. 17, 1932

Inventor:—
Paul J. M. Escole,
By:— Smith, Michael & Gardiner,
Attorneys.

Patented Oct. 10, 1933

1,930,424

UNITED STATES PATENT OFFICE 1,930,424

GLASS SHEET-FORMING APPARATUS

Paul Joseph Maximilien Escole, Jeumont, France, assignor to Forges Et Ateliers De Constructions Electriques de Jeumont, Societe Anonyme, Paris, France, a joint-stock company of France Application August 17, 1932, Serial No. 629,210, and in France August 26, 1931

7 Claims. (Cl. 49—39)

The present invention relates to the pouring of molten glass from a ladle or the like to feed sheet-forming apparatus having a plurality of rollers with a view to the manufacture of sheets or plates of cast glass intended to be ground and polished.

In the sheet forming devices usually employed, the rollers must be able to be displaced one in relation to the other by reason of the differences of temperature and fluidity of the glass and of the thickness of the sheets required. Thus for thick sheets of glass the axes of the two rollers can be in the same horizontal plane whereas for the rolling of very thin sheets the plane containing the axes of the rollers must make with the horizontal an angle which may reach 45 degrees.

It is known that the molten glass must be poured as far as possible inside the pass or gap between the rollers, in order to obviate splashing of the glass and the defects occasioned by the enclosure of bubbles of air. For the same reasons the height of fall (from the pouring ladle) must be as small as possible.

It has been proposed to pivot the ladle upon a horizontal axis parallel to the axes of the rollers, this axis being displaced parallel to itself during the tilting of the ladle, in such a way that the glass is spread along the whole length of the rollers, while reducing the height of pouring. This first or "parallel" method, if it could be accompanied by a movement for bringing the ladle towards or separating it slightly from the pass or gap, would allow the pouring of the glass exactly in the pass or gap.

The drawback of this method is that the free fall of the stream of glass is interfered with by the movement of translation of the ladle; the glass clinging to the rim of the ladle becomes churned up and forms eddies enclosing air bubbles, which subsist in the rolled glass and constitute defects known by the name of bubbles or striæ.

According to the second method, the ladle is made to tilt around an axis perpendicular to the axes of the rollers, the ladle being submitted at the same time to a movement of translation in such a way as to feed the sheet-forming device for the whole length of the rollers.

In order to diminish the width of the stream or wave of glass, there might be utilized cylindrical or oblong ladles, pouring from the narrower side. However the use of these ladles is not efficient unless the axes of the rollers are in the same horizontal plane, and they cannot be employed conveniently when the plane containing the axes of the rollers is inclined as mentioned above. In fact, in this latter case, the glass cannot fall directly into the pass or gap and it rebounds from the upper roller on to the lower roller, thus causing (just as in the preceding method) bubbles or striæ resulting from the air bubbles enclosed in the glass. Moreover the height of fall of the glass is always very great in relation to the pass or gap.

According to the present invention, the displacement of the ladle, pot or the like, takes place parallel to the rollers, as in the two preceding cases, but the horizontal axis of tilting of the ladle is oblique in relation to the parallel axes of the rollers; the angle of obliquity may vary according to the position of the upper roller, in such a way as to prevent the ladle coming into contact with it. The stream or wave of glass flowing from the ladle does not touch its rim so that the defects of the first or "parallel" method mentioned above are avoided; moreover the glass is projected directly into the pass or gap and does not rebound, so that the drawbacks of the second or "perpendicular" method mentioned are likewise not present.

According to a further feature of the present invention, the pouring of the glass is carried out in such a way that the pivoting of the ladle takes place around an axis situated about the mid-height of the wall of the ladle over which the glass is poured. This reduces the travel of the pouring edge and obviates collision of the ladle with the rollers, and the oblique position of the pouring axis further reduces the apparent amount of the travel of the pouring edge. It may be remarked that the maximum height of pouring is the height of the ladle, that is to say the lowest possible height of pouring. The dimensions of the ladle can be as great as desired and the pouring can be effected either at the wide edge or the narrow edge of the ladle without modifying the operation, since the height of the ladle pivot remains the same.

Formerly, when the pouring of the glass was effected by hand, it was necessary in order to avoid too great efforts in the handling of the ladles, to cause them to pivot around an axis passing through their centre of gravity. The tilting of the ladle was thus effected with a relatively small effort but this method presented the disadvantage that the glass fell upon the table from a relatively great height, which brought about the formation of bubbles, striæ ripples, etc. The curved trajectory or path of fall from the ladle edge contributed to the formation of successive layers or folds in the stream of glass, leading to lack of homogeneity.

The earliest mechanical pouring devices reproduced the movements hitherto effected by hand and possessed naturally the same defects.

The introduction of the process of forming plate glass between two rollers has caused the creation of a novel type of pouring device in which the ladle pivots around an axis running along one side of the rim or edge. This method has the disadvantage of necessitating an inclined plane or apron-plate for receiving the glass; the glass cooling upon this inclined plane cannot be passed between the rolls and it constitutes a manufacturing waste. Another type of mechanical pouring device is likewise employed in which the ladle is placed as low as possible above the pouring table or the rollers, and pivots around an axis situated near the centre of gravity, the pivotal axis being raised mechanically in order to prevent the bottom of the ladle from touching the table. With the dimensions of the ladle at present in use the height of supplementary lift may attain .7 to .8 metre, which gives rise to a complicated movement, which must also be synchronized with the tilting of the ladle, involving the necessity of costly mechanism.

In the preferred embodiment of the present invention, the ladle is pivoted on an axis situated about the mid-height of the wall over which the glass is poured and oblique to the axes of the sheet-forming rollers, and at the same time that the ladle is tilted around the oblique pivotal axis, the pouring gantry which supports the ladle is displaced parallel to the axes of the rollers. During the pouring, the lip of the ladle tends to approach the rollers, thus obviating the formation of bubbles, striæ, etc. etc. caused by the churning up of the glass and the dregs from the almost empty pot, when the stream falls from a great height.

The object and the scope of the present invention will be set forth in the description which follows, in the course of which reference will be made to the accompanying drawing:—

Figure 1:
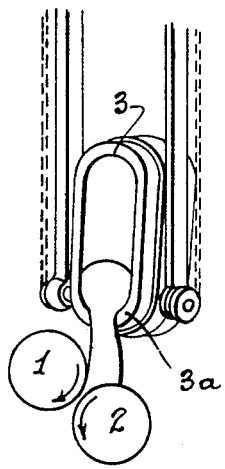
Figures 1 and 2 represent respectively in elevation and in plan the pouring of a ladle pivoted obliquely to the rollers, according to the invention.
Figure 2:
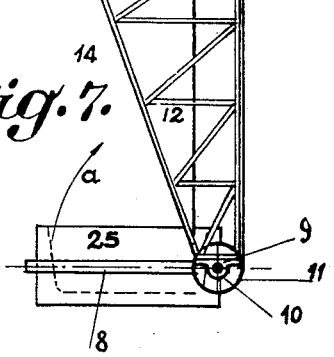

In Figures 1 and 2, it is seen that the height of the ladle 3 in relation to the rollers 1 and 2 is small, as in the case of the "parallel" method. The stream of glass falls therefore from the smallest possible height and the apparent width of the stream or sheet of glass is less than in the case of the "perpendicular" method. The glass flows directly into the pass or gap $f$ without rebounding from the upper roller 1, and the sideways position of the lip $3a$ of the ladle allows the stream of glass to flow out without being caught by the rim of the ladle.

The obliquity of the pouring axis in relation to the rollers can naturally vary according to the conditions of employment of the sheet-forming apparatus, account being taken of the temperature and the fluidity of the glass.

Figure 4:
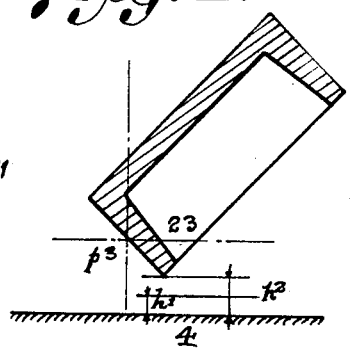
Figures 3 and 4 represent diagrammatically the positions of the ladle relatively to the casting table, in the case of pouring by pivoting around an axis situated at the mid-height of the wall of the ladle over which the glass is poured, according to the present invention.
Figure 3:
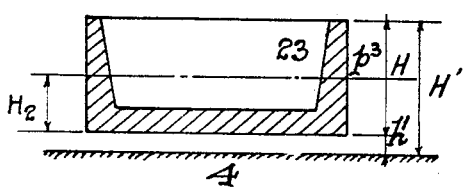

In Figures 3 and 4, the ladle 23 is shown before and after pouring by pivoting around the axis $p^3$ situated, according to the invention, at the mid-height of the side wall of the ladle over which the glass is poured. The respective values of the different indicia in this case, with the dimensions of the pots or ladles in current use, are as follows:—

$H = 800$ mm.  $H_2 = 400$ mm.  $H_1 = 900$ mm.
$h_1 = 100$ mm.  $h_2 = 250$ mm.

It will be seen in this case that the conditions of pouring are considerably simplified since the pivotal axis $p^3$ remains always at the same height; the only movement to be imparted is the rotation of the ladle. Moreover the horizontal displacement of the lip or edge over which the glass is poured will be seen to be less than half the corresponding displacement in the case of a ladle pivoting about its centre of gravity with means for lifting it during pouring. It is therefore much easier to keep the stream of glass flowing directly into the pass or gap between the rollers, as explained with reference to Figures 1 and 2.

Figure 6:
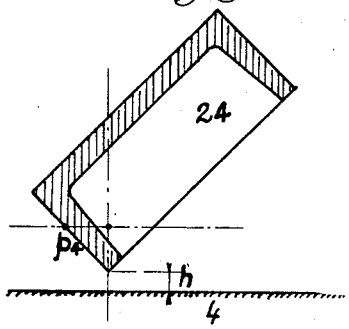
Figures 5 and 6 represent diagrammatically the positions of the ladle relatively to the casting table, in the case of pouring by pivoting around an axis situated upon the side-wall of the ladle at a height slightly less than the mid-height of the ladle, this being a modification of the preceding arrangement.
Figure 5:
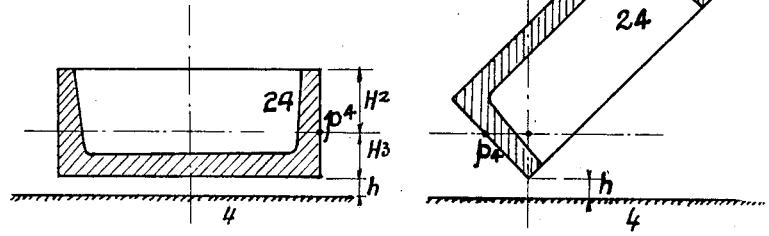

In Figures 5 and 6, the ladle 24 is shown before and after pouring, the ladle pivoting around an axis $p^4$ situated upon the wall of the ladle over which the glass is poured, but a little lower than the mid-height of the ladle, this representing a slight modification of the invention.

The values of $H_2$ and $H_3$ are selected in such a way that after the pivoting through the usual amplitude (135°), the lip of the ladle is at the same height $h$ as was the bottom of the said ladle at the beginning of the operation. This obviates the last drops of molten glass falling from the ladle causing the formation of bubbles, striæ, etc. in pouring.

In order to allow of the proper orientation of the pouring axis, the apparatus employed for carrying out the present invention will comprise for example a revolving carriage supporting the mechanism for tilting the ladles proper. This device can naturally be provided with means allowing of describing a rectilinear path parallel to the rollers for the stream of molten glass flowing from the ladle.

Figure 7:
Figure 7 represents diagrammatically in elevation a pouring gantry constructed according to the present invention.

Figure 7 shows diagrammatically a laddle-supporting gantry constructed according to the invention.

The pot 23 supported by the girdles 8 can pivot around a shaft 10 revolving in a bearing 9 arranged at the lower end of the gantry, this shaft being located at about the mid-height of the wall of the ladle, as in the case of the pivot $p^3$ in Figures 3 and 4.

A chain wheel 11 keyed upon the shaft 10 is driven by a chain 12 passing over a drum 13 placed at the top. The drum 13 is operated for the tilting or the levelling of the pot 23, by any suitable driving means, not represented in the drawing.

The jib 14 supporting the bearing 9, the pivot shaft 10, the girdles 8 and the pot or ladle 25, is supported by a truck 15, which is carried by four rollers 16 and can be propelled along a runway 17 by any suitable driving means in the direction of the arrow $b$ and reversed.

The operation of the device is the following:—

The ladle pivots in the direction of the arrow *a* around the shaft 10 and the gantry truck is propelled simultaneously along the runway at a suitable speed. The molten glass is thus poured into the pass or gap between the forming rollers 1, 2, and distributed along the whole length of these rollers, as already described with reference to Figures 1 and 2. Suitable regulation of the speed of travel allows of spreading the glass evenly over the desired length.

Naturally, according to necessities of construction or regulation, the pivotal axis represented by the shaft 10 can be displaced by a small amount in any direction whatever. In particular, the pivotal axis can be set obliquely to the axes of the rollers 1, 2 as described with reference to Figures 1 and 2, by revolving the jib 14 upon a vertical axis in the interior of the truck 15 by suitable known devices.

These known devices are not represented in the drawing and it is naturally permissible to contemplate modifications allowing of carrying out the method of pouring which forms the subject of the invention, in which the tilting axis of the ladle is placed at a variable obliquity in relation to the longitudinal axes of the rollers, the obliquely-set ladle containing the molten glass receiving in addition a movement of translation parallel to the rollers. In regulating the obliquity of the pivotal axis, regard must be had to the amount by which the one roller is set above the other, this amount varying with the thickness of the sheet to be formed and in certain cases with the temperature of the molten glass.

The simplicity of the device and of its operation will be evident, since it is possible according to the space available and without modifications to pour at the minimum height, either from the wide side or from the narrow side of the ladle. The pouring of the glass directly between the rollers, suppresses the intermediary apron or the like and therefore obviates the waste of material referred to above.

What I claim is:—

1. In glass sheet-forming apparatus comprising a pair of parallel rollers with an intermediate pass inclined to the horizontal, the combination of a container for molten glass, a pivot about which said container is tiltable to pour molten glass over one edge into said intermediate pass, and means for displacing said container parallel to the axes of said rollers during pouring, said pivot being oblique to the axes of said rollers.

2. In glass sheet-forming apparatus comprising a pair of parallel rollers with an intermediate pass inclined to the horizontal, the combination of a container for molten glass, a pivot about which said container is tiltable to pour molten glass over one side into said intermediate pass, and means for displacing said container parallel to the axes of said rollers during pouring, said pivot being oblique to the axes of said rollers and adjacent to the mid-height of the side over which the molten glass is poured.

3. In glass sheet-forming apparatus comprising a pair of parallel rollers with an intermediate pass inclined to the horizontal, the combination of a container for molten glass, a pivot for said container, said pivot being oblique to the axes of said rollers and located on an axis approximately halfway up one side of the container, and means for displacing said container parallel to the axes of said rollers during the pouring of molten glass over said one side of the container by movement of said container about said pivot.

4. In glass sheet-forming apparatus comprising a pair of parallel rollers with an intermediate pass inclined to the horizontal, the combination of a container for molten glass, a pivot for said container, said pivot being oblique to the axes of said rollers and located on an axis approximately halfway up one side of the container, and means for displacing said container parallel to the axes of said rollers during the pouring of molten glass over said one side of the container by movement of said container about said pivot, said one side of the container being located substantially level with the top of one of said rollers and approximately vertically above the other of said rollers during said pouring.

5. In glass sheet-forming apparatus comprising a pair of parallel rollers with an intermediate pass inclined to the horizontal, the combination of a container for molten glass, a pivot about which said container is tiltable to pour molten glass over an edge, said edge being in a plane oblique to the axes of said rollers when said container has been tilted, and means for displacing said container parallel to the axes of said rollers during pouring.

6. In glass sheet-forming apparatus comprising a pair of parallel rollers with an intermediate pass inclined to the horizontal, the combination of a container for molten glass, a horizontal pivot about which said container is tiltable to pour molten glass over one side into said pass, said pivot being located approximately halfway up the side over which the glass is poured, and means for displacing said container parallel to the axes of said rollers during pouring.

7. In glass sheet-forming apparatus comprising a pair of parallel rollers with an intermediate pass inclined to the horizontal, the combination of a container for molten glass, a horizontal shaft, means for securing said container to said shaft, the axis of said shaft being substantially tangential to one side of said container at a point halfway up said side, a carriage, a runway for said carriage, means for supporting said shaft from said carriage, said carriage being displaceable along said runway in a direction parallel to the axes of said rollers, means located upon said carriage for rotating said shaft to tilt said container in a direction to pour molten glass over said side into said pass, and means for orienting said shaft in obliquity to the axes of said rollers.

PAUL JOSEPH MAXIMILIEN ESCOLE.